Nov. 16, 1943.   F. S. COOPER   2,334,385
MEASURING DEVICE
Filed Feb. 12, 1942   2 Sheets-Sheet 1
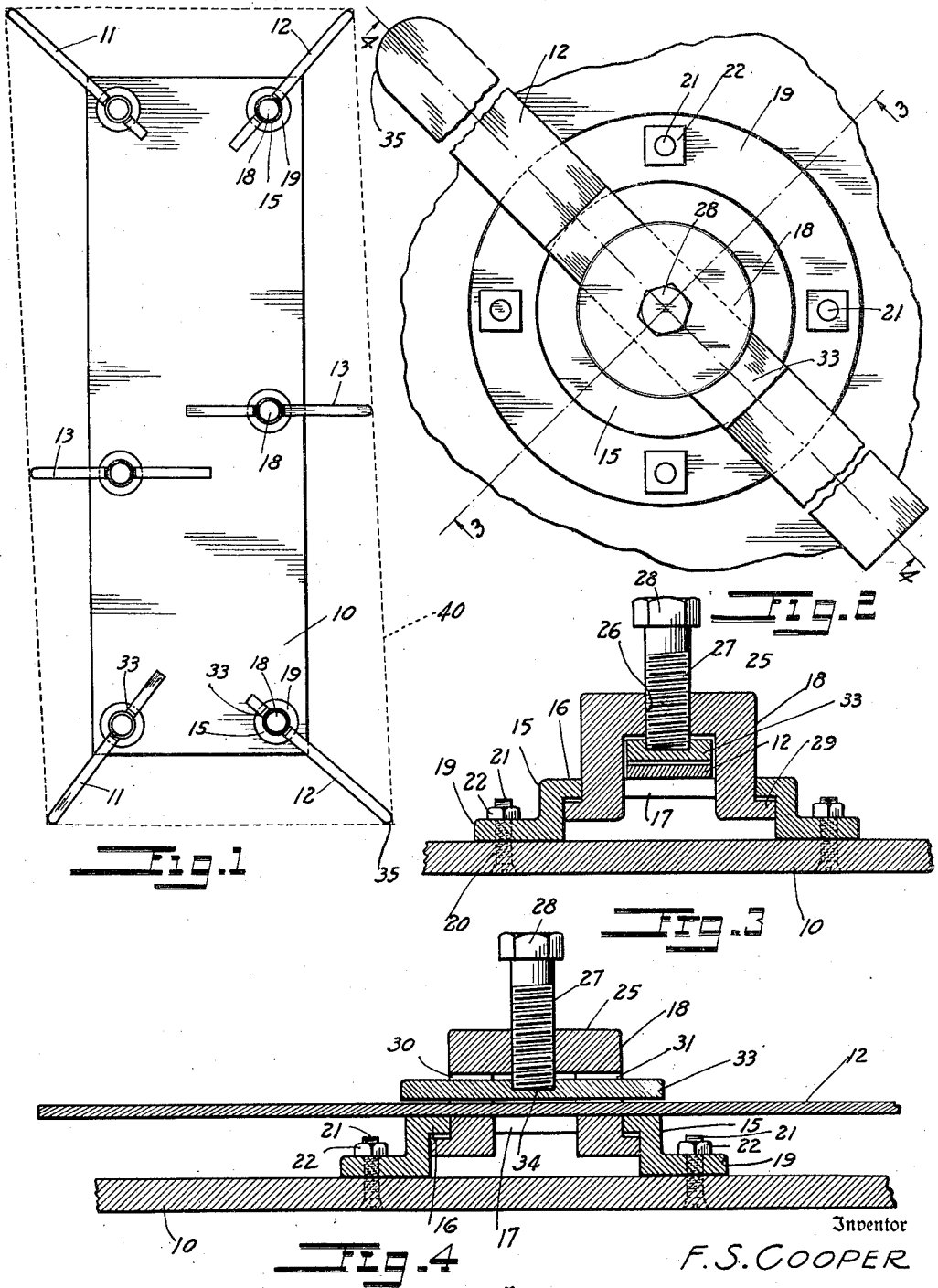

Nov. 16, 1943.    F. S. COOPER    2,334,385
MEASURING DEVICE
Filed Feb. 12, 1942    2 Sheets-Sheet 2
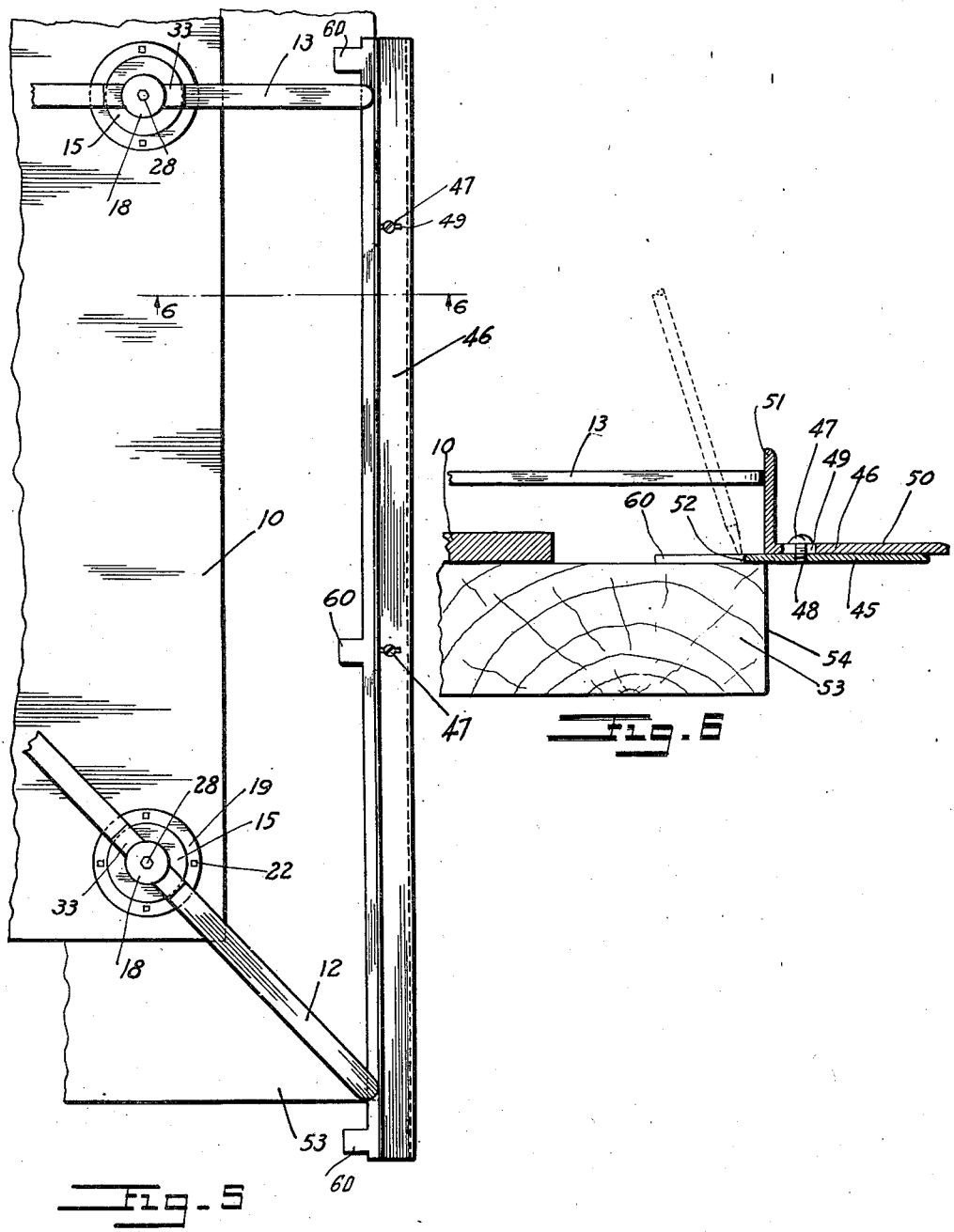
Inventor
F.S.COOPER
By
Munn, Liddy, Glaceum & Kane
Attorney Patented Nov. 16, 1943

2,334,385

UNITED STATES PATENT OFFICE 2,334,385

MEASURING DEVICE

Frederick S. Cooper, Rome, Ga.

Application February 12, 1942, Serial No. 430,679

5 Claims. (Cl. 33—175)

This invention relates to a measuring device for openings, or for profiles, considering a profile as any given portion of the external or internal boundary of an object or an enclosed space.

An object of the invention is the provision of a device for measuring the boundaries of any opening so that closures which are applied to the opening may be cut to properly fit the opening.

Another object of the invention is the provision of a device for correctly measuring boundaries of openings so that closures may be efficiently fitted into the openings in a relatively short time, said device including slidably and rotatably mounted bars, which are adapted to be projected and/or revolved in such a manner that the ends of the bars may be accurately adjusted in contact with the margins of the opening, so that when a straight-edge (or flexible rule) is applied to the ends of the bars the outline of the opening can be drawn on the closure to be fitted, by means of a lead pencil or other form of marking or scribing instrument.

A further object of the invention is the provision of a simple and efficient device for measuring openings, so that closures for the openings may be quickly and accurately ruled to fit the opening and also to provide for a predetermined clearance, said device being simple, self-contained and, due to its lightness in weight, may be readily transported, permitting the fitting of all closures for a building to be done at one conveniently located and suitably equipped place, and thereby gaining the advantages both of saving in cost and increased accuracy of work.

A further object of the invention is the provision of a simple and efficient device for measuring profiles, so that a counterpart or object which is to be fitted to a profile may be quickly and accurately ruled to fit a given profile, and also to provide for a pre-determined clearance, if desired, said device being self-contained, light in weight, and easily transported.

This invention will be best understood from a consideration of the following detailed description, in view of the accompanying drawings forming a part of the specification; nevertheless, it is to be understood that the invention is not confined to the disclosure, being susceptible of such changes and modifications as shall define no material departure from the salient features of the invention as expressed in the appended claims.

In the drawings:

Figure 1 is a plan view of my measuring device shown applied to an opening.

Figure 2 is an enlarged plan view of one of a plurality of identical and essential elements of my measuring device, such as element hereinafter being referred to as a "unit."

Figure 3 is a section taken along the line 3—3 of Fig. 2.

Figure 4 is a transverse section taken along the line 4—4 or Fig. 2.

Figure 5 is a fragmentary plan view of my measuring device showing a particular form of straight-edge assembly.

Figure 6 is a vertical section taken along the line 6—6 of Fig. 5.

Referring more particularly to Figs. 1 to 4 inclusive, 10 designates a base plate which may be made of metal, wood or some composition material which has sufficient strength and rigidity for the purpose. The base plate is ordinarily rectangular in shape and is provided with a plurality of units carrying adjustable bars 11, 12 and 13 slidably mounted thereon. Said units being ordinarily located at the corners of the base plate, and also at points intermediate the ends of the plate; but units in any desired number, and at any desired location may be added, removed, or re-located, as needed.

The following is a description of a unit, all units being identical:

An inverted cup-shaped member generally designated by the numeral 15 has a top portion 16 provided with an opening 17 which is adapted to receive a second cup-shaped member generally designated by the numeral 18. The cup-shaped member 15 has an annular flange 19 at its lower edge and this flange is provided with a plurality of openings 20 to receive threaded bolts 21. Nuts 22 are threaded onto the outer ends of the bolts for clamping the flange 19 and likewise the cup-shaped member 15 to the base plate 10 in the various positions shown in Fig. 1.

The cup-shaped member 18 has its outer end closed as shown at 25 and this closed or top portion has a threaded opening 26 to receive a threaded bolt 27 which has a head 28 at its outer end. The inner end of the member 18 is provided with a lateral flange 29 which is adapted to engage the inner face of the remaining portion of the top 16 of the member 15.

The member 18 has a pair of diametrically opposed passages 30 and 31 which are adapted to receive a clamping bar 33 having its ends extending beyond the outer walls of the member 18. The threaded bolt 27 has its inner end received within a pocket 34 formed in the outer face of the plate 33.

One of the measuring bars 11 to 13 inclusive is also inserted through the openings 30 and 31 and the intermediate portion of this bar is located between the plate 33 and the top 16 of the member 15.

The outer ends of each of the said measuring bars may be semi-circular, as shown at 35, may be given any other desirable shape in manufacturing or in use and, in addition, may have separate points affixed to them. The two ends of each bar may have different shapes. In general the shape of the end of the bar, or of an attached point, if used, will be determined by the particular requirements of the work being done.

It will be seen by this construction that the cup-shaped member 18 is inserted through the opening 17 of the cup-shaped member 15 before the annular flange 19 has been secured to the base member 10. When the clamping plate 33 and a measuring bar are inserted through the alined openings 30 and 31 in the cup-shaped member 18, said cup-shaped member will be maintained in operative relation within the member 15. The tightening of the bolt 27 will cause the clamping plate 33 to press on the measuring bar and thus hold the elements together.

When it is desired to measure an opening such as shown at 40 in dotted lines in Fig. 1, it is only necessary to place the base plate 11 within the opening and then adjust the bars 11 and 12 until the outer free ends engage the corners of the opening 40. As each bar is properly positioned the bolt 27 is turned for clamping the bar in operative position. After the bars 11 and 12 have been properly positioned with their ends engaging the various corners of the opening the bars 13 may be similarly adjusted outwardly from their supports until their free ends engage the side walls of the opening, after which the bolts 27 may be turned to secure the bars in rigid position. The entire device may then be removed from the opening and carried to any convenient place for actual fitting of the door or closure.

Any type of straight-edge may be employed for cooperation with the ends of the bars 11 to 13 inclusive, but in view of the fact that it is necessary to allow for a definite clearance so that the door or other closure which is fitted to the opening may be swung to and fro without binding, and that this clearance varies with the type of work, a special form of straight-edge assembly is preferable for use and such straight-edge assembly is shown in Figs. 5 and 6.

The straight-edge assembly is made preferably of metal, and actually includes, in addition to other parts, two straight-edges: a long, flat bar 45, which supports and is adjustably connected to a long bar 46 of right-angular cross section. A plurality of locking screws 47 are threaded into openings 48 in the bar 45 and pass through elongated slots 49 in the horizontal flange 50 of the bar 46. The elongated slots 49 permit the bar 46 to slide upon the flat bar 45 when the screws 47 are loosened for a short distance in a direction perpendicular to the axes of the bars 45 and 46, which motion permits the relative adjustment of the bars 45 and 46, being the two straight-edges, for any desired clearance within the limits of said motion.

It should be assumed that the measuring device has been adjusted to a given opening, removed and placed upon the door or closure 53 which is to be fitted with the door or closure 53 resting in a horizontal plane on a bench or other form of support, and that the straight edge assembly has been adjusted for a given desired clearance, and applied to the work with the inner edge 52 of the flat bar 45 resting on the edge of the door or closure 53, and the vertical flange 51 of the bar 46 engaging the ends of the bars 12 and 13 of the measuring device.

During the application of the device the face of the vertical flange 51 will be in contact with the ends of the bars 12 and 13 and will lie in or represent the plane of the corresponding part of the boundary of the opening. The inner edge 52 of the flat bar 45 will lie at a distance from the plane of the boundary of the opening equal to the clearance for which the straight-edge assembly has been adjusted. When a pencil or scribe is employed for drawing a line along the inner edge 52 of the flat bar 45, said line will indicate on the door or closure 53 the part which is to be cut away to give the clearance for which the straight-edge assembly has been adjusted. When this procedure has been repeated around the perimeter of the door or closure 53, the position of the measuring device relative to the door or closure being maintained unchanged by clamps or otherwise, the door or closure will bear a penciled or scribed outline along which it is adapted to be cut to give the desired clearance without further measuring or scribing.

Three or more straps 60, of the same thickness, and lying in the same plane as the flat bar 45, are welded or otherwise secured to its inner edge 52, and project inwardly therefrom a short distance. These straps are adapted to give the straight-edge assembly additional bearing surface on the top of the door or closure 53, and hold the bar 45 parallel to, and the flange 51 perpendicular to, the plane of the door or closure 53. These straps 60 are purposely made narrow so that they will not cause material interruptions in the penciled or scribed lines.

The foregoing description of the measuring device and its use applies primarily to the fitting of doors or closures to openings. Due to the flexibility of the device, its adaptation to profile work is a matter of ordinary mechanical procedure. The device in the form and size referred to herein may be used without adaptation for certain shapes and sizes of profiles—for example, the fittings of shelves and/or cabinets in room corners or closets. However, other classes and sizes of work may require varying sizes of the device, and variations in shape of the bars and points.

I claim:

1. A measuring device for openings comprising a base member adapted to be placed within an opening, bars adjustably mounted on the base member and having the outer ends thereof engaging points in the opening which when connected by lines will graphically define the outlines of said opening and means for slidably mounting the bars on the base member and including an inverted cup-shaped member secured to the base and having an opening in the top, a second inverted cup-shaped member inserted upwardly through said opening, a flange on the bottom of the second member engaging the inner face of the top of the first member, the second member having diametrically disposed openings in the side walls to slidably receive the bar, a clamping plate located between the bar and the inner wall of the top of the second cup-shaped member, and a bolt threaded into an opening in the top of the second member and having its inner free end pressing on the plate for retaining the adjustable bar against movement.

2. A measuring device for openings comprising a rectangularly shaped base member, measuring bars adjustably mounted on the base member at the corners thereof and at points intermediate the opposite ends of said base member, means for mounting said bars including a plurality of supporting elements secured to the base member in spaced relation, a clamping element slidably connected to each supporting element, a bar slidably located between the supporting element and the clamping element, and means cooperating with the two elements for binding the associated bar against movement after the same has been properly adjusted.

3. A measuring device for openings comprising a base member, measuring bars adjustably mounted on the base member, means for mounting said bars including a plurality of supporting elements secured to the base member in spaced relation at points along the side edges and at the corners of said base member, a clamping element slidably connected to each supporting element, a bar slidably located between the supporting element and the clamping element, means cooperating with the two elements for binding the associated bar against movement after the same has been properly adjusted, and a clamping plate located between the last-mentioned means and the bar.

4. A measuring device for openings comprising a base member, measuring bars adjustably mounted on the base member, means for mounting said bars including a plurality of supporting elements secured to the base member in spaced relation, each supporting element having a passage in the outer end thereof, an inverted cup-shaped member slidable in the passage, cooperating means on the cup-shaped member and the supporting element for limiting movement between the element and the member, said cup-shaped member having a transverse passage in which the measuring bar is longitudinally movable, and means carried by the cup-shaped member for moving the element and member relative to each other and for retaining the bar against movement.

5. A measuring device for openings comprising a base member, measuring bars adjustably mounted on the base member, means for mounting said bars including a plurality of supporting elements secured to the base member in spaced relation at points along the side edges and at the corners of said base member, each supporting element having a passage therein, a slidable element rotatably mounted in the passage, cooperating means on the slidable element and the supporting element for limiting relative movements between said elements, said slidable element having a transverse passage in which the measuring bar is longitudinally adjustable, and means carried by the slidable element for clamping the bar against movement after the same has been adjusted either angularly or longitudinally.

FREDERICK S. COOPER.